United States Patent
Stephens et al.

(10) Patent No.: US 11,301,375 B2
(45) Date of Patent: *Apr. 12, 2022

(54) REDUCING SYNCHRONIZATION RELIANCE IN MARKING

(71) Applicant: Microsoft Technology Licensing, LLC, Redmond, WA (US)

(72) Inventors: Maoni Zhang Stephens, Kirkland, WA (US); Patrick Henri Dussud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,218

(22) Filed: Sep. 12, 2020

(65) Prior Publication Data

US 2020/0409839 A1 Dec. 31, 2020

Related U.S. Application Data

(63) Continuation of application No. 16/268,041, filed on Feb. 5, 2019, now Pat. No. 10,802,965.

(51) Int. Cl.
*G06F 12/02* (2006.01)
*G06F 9/30* (2018.01)

(52) U.S. Cl.
CPC ...... *G06F 12/0253* (2013.01); *G06F 9/30021* (2013.01); *G06F 2212/1044* (2013.01)

(58) Field of Classification Search
None
See application file for complete search history.

(56) References Cited

U.S. PATENT DOCUMENTS 6,502,111 B1 12/2002 Dussud
7,389,395 B1 * 6/2008 Garthwaite ......... G06F 12/0269
711/165

(Continued)

OTHER PUBLICATIONS

"Cloud Gal Episode 2: Maoni Stephens", excerpt, full video available at <<https://www.youtube.com/watch?v=OwpMnxI5FLw>>, 1 page, May 22, 2017 (copy submitted in parent U.S. Appl. No. 16/268,041, filed Feb. 5, 2019).

(Continued)

*Primary Examiner* — Tracy C Chan
(74) *Attorney, Agent, or Firm* — Ogilvie Law Firm

(57) ABSTRACT

Memory reclamation is tailored to avoid certain synchronization instructions, speeding concurrent garbage collection while preserving data integrity and availability. Garbage collection reclaims objects no longer in use, or other unused areas of memory. Pointers are partitioned into address portions holding address values and non-address portions having a special bit. Marking code writes only the non-address portions, setting the special bit as a mark reference, relocation candidate, etc. Mutator threads may concurrently mutate the entire pointer to update the address, but mutation does not cause incorrect reclamations or failure to do other operations such as relocation. Meanwhile, execution speed is increased by avoiding CAS (compare-and-swap instructions or compare-and-set) synchronization instructions. Non-CAS yet nonetheless atomic writes are used instead. Mutators run in user or kernel address spaces. Partitioned pointers and their use may be enclosed to avoid runtime errors by code that expects references to be in a canonical non-partitioned form.

20 Claims, 6 Drawing Sheets

(56) References Cited

U.S. PATENT DOCUMENTS

| | | | |
|---|---|---|---|
| 8,566,368 B2 | 10/2013 | Massarenti | |
| 9,208,081 B1* | 12/2015 | Dice | G06F 12/0269 |
| 2003/0069905 A1 | 4/2003 | Dussud | |
| 2005/0033781 A1* | 2/2005 | Dussud | G06F 12/0269 |
| 2005/0044057 A1 | 2/2005 | Bluvshteyn et al. | |
| 2005/0160421 A1 | 7/2005 | Bluvshteyn et al. | |
| 2005/0235120 A1 | 10/2005 | Dussud | |
| 2006/0020766 A1 | 1/2006 | Dussud | |
| 2006/0085460 A1 | 4/2006 | Peschel-Gallee et al. | |
| 2006/0085494 A1 | 4/2006 | Dussud et al. | |
| 2006/0156152 A1 | 7/2006 | Trowbridge et al. | |
| 2006/0230387 A1 | 10/2006 | Prakriya et al. | |
| 2007/0011658 A1 | 1/2007 | Stephens | |
| 2007/0022268 A1 | 1/2007 | Stephens | |
| 2007/0094651 A1 | 4/2007 | Stephens et al. | |
| 2007/0094671 A1 | 4/2007 | Stephens et al. | |
| 2008/0172431 A1 | 7/2008 | Stephens et al. | |
| 2008/0281885 A1 | 11/2008 | Dussud | |
| 2008/0281886 A1* | 11/2008 | Petrank | G06F 12/0269 |
| 2009/0172305 A1 | 7/2009 | Shpeisman et al. | |
| 2009/0222802 A1 | 9/2009 | Dussud et al. | |
| 2009/0254596 A1 | 10/2009 | Dussud et al. | |
| 2009/0259702 A1 | 10/2009 | Stephens et al. | |
| 2009/0265402 A1* | 10/2009 | Dussud | G06F 12/0269 |
| 2009/0292705 A1 | 11/2009 | Mckenney et al. | |
| 2009/0300085 A1 | 12/2009 | Stephens et al. | |
| 2010/0070957 A1 | 3/2010 | Mariani et al. | |
| 2010/0082710 A1 | 4/2010 | Kilner et al. | |
| 2010/0114997 A1* | 5/2010 | Micic | G06F 12/0253 707/813 |
| 2010/0318584 A1 | 12/2010 | Krishnaprasad et al. | |
| 2011/0173634 A1* | 7/2011 | Kottapalli | G06F 12/0857 718/108 |
| 2011/0191508 A1* | 8/2011 | Printezis | G06F 12/0253 710/53 |
| 2011/0264713 A1* | 10/2011 | Ylonen | G06F 12/0269 707/818 |
| 2013/0091186 A1* | 4/2013 | Stephens | G06F 12/0253 707/813 |
| 2015/0227414 A1 | 8/2015 | Varma | |
| 2016/0239413 A1 | 8/2016 | Stephens et al. | |
| 2016/0306739 A1 | 10/2016 | Stephens et al. | |
| 2017/0116116 A1* | 4/2017 | Mittal | G06F 12/0253 |
| 2017/0116247 A1* | 4/2017 | Jonsson | G06F 9/52 |
| 2017/0228223 A1 | 8/2017 | Bosworth et al. | |
| 2017/0262364 A1 | 9/2017 | Liden et al. | |
| 2017/0344473 A1 | 11/2017 | Gidra et al. | |
| 2017/0351490 A1 | 12/2017 | Wrighton et al. | |
| 2018/0004655 A1* | 1/2018 | Wilkinson | G06F 9/30021 |
| 2018/0074865 A1 | 3/2018 | Rungta et al. | |
| 2018/0217779 A1 | 8/2018 | Stephens et al. | |
| 2018/0217927 A1 | 8/2018 | Stephens et al. | |
| 2018/0365080 A1 | 12/2018 | Wang et al. | |
| 2019/0095323 A1* | 3/2019 | Gidra | G06F 12/0269 |
| 2021/0208954 A1 | 7/2021 | Stephens et al. | |

OTHER PUBLICATIONS

"Memory barrier", retrieved from <<https://en.wikipedia.org/wiki/Memory_barrier>>, 4 pages, Dec. 18, 2018 (copy submitted in parent U.S. Appl. No. 16/268,041, filed Feb. 5, 2019).

"Disruptor: High performance alternative to bounded queues for exchanging data between concurrent threads", retrieved from <<https://lmax-exchange.github.io/disruptor/files/Disruptor-1.0.pdf>>, 11 pages, May 2011 (copy submitted in parent U.S. Appl. No. 16/268,041, filed Feb. 5, 2019).

"Compare-and-swap", retrieved from <<https://en.wikipedia.org/wiki/Compare-and-swap>>, 7 pages, Jul. 30, 2018 (copy submitted in parent U.S. Appl. No. 16/268,041, filed Feb. 5, 2019).

Hao Wu, et al., "A Study of Lock-Free Based Concurrent Garbage Collectors for Multicore Platform", retrieved from <<https://www.ncbi.nlm.nih.gov/pmc/articles/PMC4100292/>>, 17 pages, Apr. 23, 2014 (copy submitted in parent U.S. Appl. No. 16/268,041, filed Feb. 5, 2019).

Y. Ossia, et al., "A Parallel, Incremental and Concurrent GC for Servers", retrieved from <<http://www.cs.ucsb.edu/~ckrintz/racelab/gc/papers/ossia-concurrent.pdf>>, 2002, 12 pages (copy submitted in parent U.S. Appl. No. 16/268,041, filed Feb. 5, 2019).

"Which CPU architectures support Compare And Swap (CAS)?", retrieved from <<https://stackoverflow.com/questions/151783/which-cpu-architectures-support-compare-and-swap-cas>>, Nov. 26, 2009, 26 pages (copy submitted in parent U.S. Appl. No. 16/268,041, filed Feb. 5, 2019).

"Fundamentals of Garbage Collection", retrieved from <<https://docs.microsoft.com/en-us/dotnet/standard/garbage-collection/fundamentals>>, Mar. 29, 2017, 15 pages (copy submitted in parent U.S. Appl. No. 16/268,041, filed Feb. 5, 2019).

"Using the extra 16 bits in 64-bit pointers", retrieved from <<https://stackoverflow.com/questions/16198700/using-the-extra-16-bits-in-64-bit-pointers>>, Sep. 20, 2018, 7pages (copy submitted in parent U.S. Appl. No. 16/268,041, filed Feb. 5, 2019).

"Full Garbage Collection vs. Major Garbage Collection", retrieved from <<https://stackoverflow.com/questions/50081873/full-garbage-collection-vs-major-garbage-collection>>, Apr. 29, 2018, 5 pages (copy submitted in parent U.S. Appl. No. 16/268,041, filed Feb. 5, 2019).

"How to avoid garbage collection Stop the World Events in IBM Java/JVM", retrieved from <<https://stackoverflow.com/questions/44550678/how-to-avoid-garbage-collection-stop-the-world-events-in-ibm-java-jvm>>, Jun. 14, 2017, 6 pages (copy submitted in parent U.S. Appl. No. 16/268,041, filed Feb. 5, 2019).

"Java very large heap sizes", retrieved from <<https://stackoverflow.com/questions/214362/java-very-large-heap-sizes/9300779#9300779>>, Sep. 17, 2014, 30 pages (copy submitted in parent U.S. Appl. No. 16/268,041, filed Feb. 5, 2019).

"Memory Limits for Windows and Windows Server Releases", retrieved from <<https://docs.microsoft.com/en-us/windows/desktop/Memory/memory-limits-for-windows-releases>>, May 30, 2018, 13 pages (copy submitted in parent U.S. Appl. No. 16/268,041, filed Feb. 5, 2019).

"Virtual address space", retrieved from <<https://en.wikipedia.org/wiki/Virtual_address_space>>, Mar. 8, 2018, 3 pages (copy submitted in parent U.S. Appl. No. 16/268,041, filed Feb. 5, 2019).

"Atomic vs. Non-Atomic Operations", retrieved from <<https://preshing.com/20130618/atomic-vs-non-atomic-operations/>>, Jun. 18, 2013, 13 pages (copy submitted in parent U.S. Appl. No. 16/268,041, filed Feb. 5, 2019).

"In MSVC, why do InterlockedOr and InterlockedAnd generate a loop instead of a simple locked instruction?", retrieved from <<https://stackoverflow.com/questions/47019366/in-msvc-why-do-interlockedor-and-interlockedand-generate-a-loop-instead-of-a-si>>, Oct. 30, 2017, 5 pages (copy submitted in parent U.S. Appl. No. 16/268,041, filed Feb. 5, 2019).

"Object-oriented programming", retrieved from <<https://en.wikipedia.org/wiki/Object-oriented_programming>>, Jan. 15, 2019, 14 pages (copy submitted in parent U.S. Appl. No. 16/268,041, filed Feb. 5, 2019).

"F90_gc: Fortran Garbage Collector Module", retrieved from <<https://www.nag.com/nagware/np/r52_doc/f90_gc.html>>, no later than Jan. 19, 2019, 4 pages (copy submitted in parent U.S. Appl. No. 16/268,041, filed Feb. 5, 2019).

"How many CPU cycles are needed for each assembly instruction?", retrieved from <<https://stackoverflow.com/questions/692718/how-many-cpu-cycles-are-needed-for-each-assembly-instruction>>, Jun. 14, 2015, 12 pages (copy submitted in parent U.S. Appl. No. 16/268,041, filed Feb. 5, 2019).

"Memory page write detection on Windows & Linux", retrieved from <<https://stackoverflow.com/questions/7727461/memory-page-write-detection-on-windows-linux>>, Oct. 11, 2011, 6 pages (copy submitted in parent U.S. Appl. No. 16/268,041, filed Feb. 5, 2019).

"Getting to Go: The Journey of Go's Garbage Collector", retrieved from <<https://blog.golang.org/ismmkeynote>>, Jul. 12, 2018, 47 pages (copy submitted in parent U.S. Appl. No. 16/268,041, filed Feb. 5, 2019).

(56) References Cited

OTHER PUBLICATIONS

"International Search Report and Written Opinion Issued in PCT Application No. PCT/US2020/014535", dated May 15, 2020, 28 Pages. (copy submitted in parent U.S. Appl. No. 16/268,041, filed Feb. 5, 2019).

"International Search Report and Written Opinion Issued in PCT Application No. PCT/US20/060813", dated Mar. 2, 2021, 11 Pages.

"Non Final Office Action Issued In U.S. Appl. No. 16/735,418", dated Nov. 8, 2021, 24 Pages.

Harper, et al., "Performance Impact of Lock-Free Algorithms on Multicore Communication APIs", In Repository of arXiv:1401.6100v1, Jan. 9, 2014, 16 Pages.

\* cited by examiner

REDUCING SYNCHRONIZATION RELIANCE IN MARKING

The present application is a continuation of, claims priority to, and incorporates by reference the entirety of, U.S. patent application Ser. No. 16/268,041 filed 5 Feb. 2019.

BACKGROUND

In computer programming, garbage collection (GC) helps provide automatic memory management. The "garbage" in question is memory space which has been allocated to a program for use, is no longer needed by that program, but is not yet available for use by other programs. The garbage collector tries to identify such areas of memory so they can be reclaimed for subsequent re-allocation.

Garbage collection can free programmers from the need to manually release data objects that are no longer needed, thus making programming easier. Garbage collection can also help prevent some runtime errors, thereby enhancing cybersecurity by improving the integrity and availability of data. Many programming languages either require garbage collection, or else allow garbage collection as an option. Some software development environments allow both garbage collection and manual memory management in a given program.

Efficient implementation of garbage collection can be a high priority because garbage collectors may run frequently or at unpredictable times, or both, and may significantly slow down user program execution. Indeed, most if not all garbage collectors sometimes utilize a "stop the world" approach which prevents user programs from running at the same time as the garbage collector. However, merely reducing the amount of time spent on garbage collection may also reduce the amount of memory reclaimed, and thus hamper user program performance in other ways, e.g., by increasing the time spent swapping data between volatile and non-volatile memory devices.

SUMMARY

As taught herein, some memory reclamation tools and processes are tailored to improve computing system memory management functionality. The tailoring reduces or eliminates usage of certain relatively slow synchronization instructions, such as compare-and-swap instructions. Concurrent garbage collection may be made measurably faster, without an increased risk to the integrity and availability of data that is still in use.

Some embodiments for garbage collection which are presented herein avoid reliance on processor CAS instructions for garbage collection marking. The avoided CAS instructions may include one or more compare-and-swap instructions or compare-and-set instructions. Some embodiments include a digital memory having addressable units, e.g., bytes, with each addressable unit being individually addressable using a respective address value. One or more pointers reside in the memory, with each pointer residing in at least two adjacent addressable units. Each pointer has an address portion which holds an address value, and a garbage collection portion which is exclusive of the address portion. A processor is in operable communication with the memory. The processor has an instruction set that includes at least one write instruction which upon execution atomically writes a value to at least one addressable unit. The write instruction is exclusive of any CAS instruction. That is, to emphasize the avoidance of CAS instructions, a CAS instruction is not deemed a "write instruction" as that phrase is used herein, even though executing a CAS instruction may include writing a value.

The embodiments in question also include a mutator thread, which upon execution mutates at least one or more address values of one or more respective pointers. In general, executing the mutator thread will perform some useful operation as part of a user program (or as part of a kernel), but the nature of that work is not central to an understanding of the teachings herein. The mutator thread is most relevant here with respect to its potential interaction with the garbage collector, and in particular with respect to how the garbage collector and the mutator thread (or mutator threads) interact through address values during their concurrent execution.

The embodiments in question also include a garbage collector, which runs concurrently with the mutator thread during a garbage collection marking phase. As used here, "concurrent" means "at least partly overlapping in time"— full simultaneity is allowed, but not required, for concurrency. The garbage collector uses the write instruction to atomically set a reference mark bit in the garbage collection portion of a pointer, as an indication that the address portion of the pointer identified an area of memory that was not known to be available for reclamation when last checked. In operation, the garbage collection includes a marking phase. By proceeding according to teachings herein, the marking phase preserves the integrity of address values written by the mutator thread, and does so without reliance on CAS instructions even though the mutator thread and the garbage collector run concurrently with each other.

Some embodiments or embodiment environments presented herein provide or utilize actions that mark areas of memory in a computing system during garbage collection. These actions may include a garbage collector receiving locations of one or more pointers which reside in a digital memory of the computing system, with each pointer having an address portion which holds an address value and a garbage collection portion which is exclusive of the address portion. These actions may also include a mutator thread executing concurrently with the garbage collector and having access to at least the address portion of at least one of the pointers. These actions may also include the garbage collector using a non-CAS write instruction to mark an area of the memory by atomically setting a reference mark bit in the garbage collection portion of a pointer whose address identifies the area of memory, without said setting overwriting the address. These actions may also include avoiding treating as reclaimable memory any area of the memory which is still in use by at least one user space thread, e.g., avoiding false negatives when determining whether an area of memory is still in use. Accordingly, these actions may perform the garbage collection marking phase without reliance on CAS instructions.

Other technical mechanisms, structures, and activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
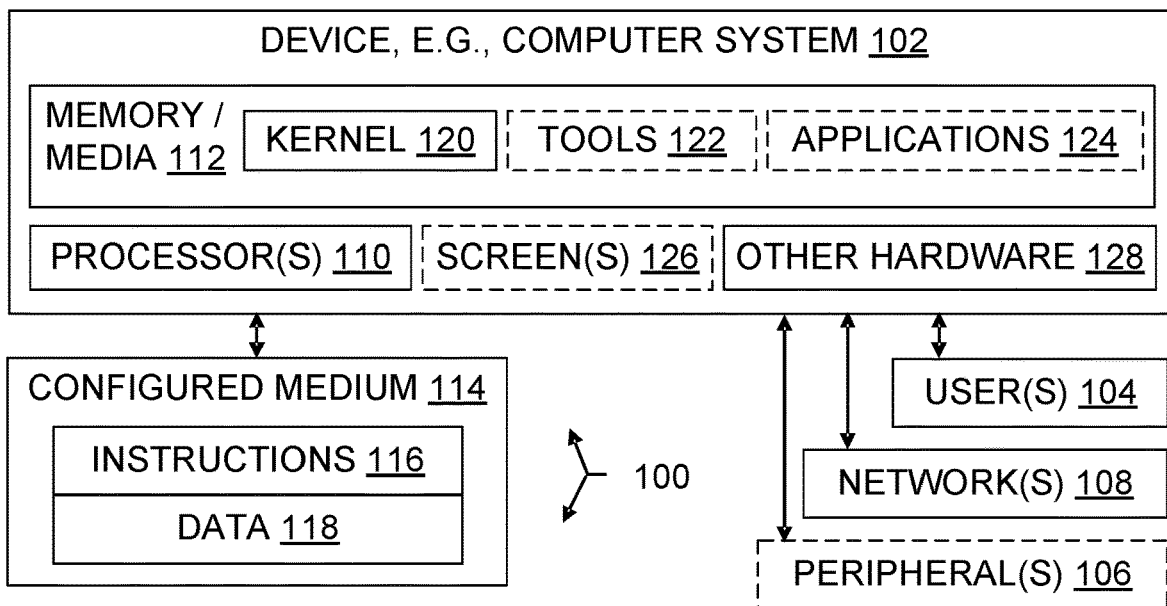
FIG. 1 is a block diagram illustrating a computer system generally and also illustrating a configured storage medium generally.

Many innovations expand beyond their origins, but understanding an innovation's origins can help one more fully appreciate the innovation. In the present case, some teachings presented herein were motivated by a technical challenge of reducing time spent doing garbage collection in a "stop the world" status while still providing adequate memory reclamation for user threads. The challenge led to consideration of possible technical changes to characteristics such as garbage collection frequency/triggers, concurrency of garbage collection with user thread execution, garbage collector creation and handling of floating garbage, and sweep versus compaction algorithms. But for present purposes, the focus is narrower. The inventors conceived technical changes which can reduce garbage collector code reliance on certain relatively expensive synchronization instructions (e.g., compare-and-swap, compare-and set) during a garbage collection marking phase, and do so without compromising the integrity of address mutations that are concurrently made outside the garbage collection code. Other technical challenges addressed by the innovations taught here will also be apparent to one of skill from the discussion provided below.

Although garbage collection for implementations of the programming language Java® (mark of Oracle America, Inc.) was a motivating example, the tools and techniques described herein are not limited to use in supporting that language. Embodiments may also or alternatively support garbage collection of memory which was allocated using programs developed with other languages. Likewise, although garbage collection of objects was a motivating example, and objects are used in some examples described herein, embodiments may also or alternatively support garbage collection of other data structures, including data structures which are allocated in programs that do not follow an object-oriented programming paradigm. One of skill will acknowledge that garbage collection is sometimes used to reclaim memory for items other than object-oriented programming language objects, e.g., some implementations of FORTRAN have a garbage collector, as do many beginner languages such as BASIC and Logo.

Some embodiments store information in the virtual address space of a program and use this information to detect whether an item can be moved in a compaction operation. This may provide a garbage collection speed-up of up to 15% or more, in some systems.

Some embodiments described herein may be viewed by some people in a broader context. For instance, concepts such as addressing, concurrency, memory, reclamation, and usage may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to safely reduce program execution delays caused by synchronization instructions. Other configured storage media, systems, and methods involving addressing, concurrency, memory, reclamation, or usage are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular programming languages, tools, contexts, identifiers, fields, properties, files, data structures, notations, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as memory allocation, memory address updates, reallocation of memory after use, and the selection or exclusion of particular kinds of processor instructions, which are all activities deeply rooted in computing technology. In particular, "memory" means digital memory storing bits, and "processor" means an integrated circuit or other circuit which processes bits, so purely mental processes are excluded. Some embodiments improve the functioning of computing systems by reducing the time spent reclaiming memory, without thereby increasing the risk to data stored in memory. Although garbage collection has been widely implemented using compare-and-swap instructions, some embodiments taught herein provide an alternative, thus allowing the performance of concurrent secure garbage collection on computing systems whose processor architecture lacks compare-and-swap instructions. Other advantages based on the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.

ALU: arithmetic and logic unit
API: application program interface, a.k.a. application programming interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
ID: identifier
OS: operating system
RAM: random access memory
ROM: read only memory Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and in some systems may also be known by another name, such as "task," "process," "coroutine," or even "interrupt handler", for example. In other systems, "process" and "thread" have different meanings from one another, e.g., a process may contain one or more threads. In a given system, the threads may run in parallel, in sequence, or in a combination of parallel execution (e.g., multiprocessing) and sequential execution (e.g., time-sliced). In particular, threads may run "concurrently", meaning that their execution overlaps at least in part, e.g., they may each have access to the same memory location of other resource in a way that requires synchronization or another mechanism to prevent harm from the different ordering of accesses that can occur.

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines,
BIOS code, and similar hardware interface software.

"Code" means processor instructions, data (which includes constants, variables, and data structures), or both instructions and data. "Code" by itself and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, services, cloud infrastructure components, middleware, and other code written by programmers (who are also referred to as developers) and/or automatically generated.

"Routine" means a function, method, procedure, or other piece of code which can receive control non-sequentially by being called and then return, e.g., via an address pushed on a call stack. Other than parameterless void routines which neither accept parameters nor return a value, routines also use a stack to receive value(s), to return value(s), or both.

A "function" is a routine which returns a value at the point it was called.

"Service" means a consumable program offering in a cloud computing environment or other network or computing system environment.

"Cloud" means pooled resources for computing, storage, and networking which are elastically available for measured on-demand service. A cloud may be private (e.g., on-premises), public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

As used herein, "include" allows additional elements (i.e., includes means "comprises" in the patent law sense) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as setting a bit, tracing addresses, reading or writing a byte of memory, and executing processor instructions, are each understood herein as inherently digital. A human mind cannot interface directly with a CPU or other processor, or with RAM or other digital storage, to read and write the necessary data and perform the necessary operations on digital values such as bits and bytes to perform the memory management steps taught herein. This would be well understood by persons of skill in the art in view of the present disclosure, but others may sometimes need to be informed or reminded of the facts.

Unless stated otherwise, at least some embodiments are also presumed to be capable of operating at scale in production environments, or in testing labs for production environments, when appropriately situated and configured, as opposed to being mere thought experiments. For present purposes, "operating at scale" means operating in at least one of the following conditions: reclaiming memory in a heap whose size is at least 1GB (one gigabyte), reclaiming memory concurrently with at least two user threads, reclaiming memory in a system whose processor has at least four cores, or reclaiming memory whose memory addresses include at least 48 bits.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as addressing, aiding, allocating, avoiding, checking, compacting, comparing-and-setting, comparing-and-swapping, creating, defining, executing (a.k.a. running), holding, identifying, ignoring (e.g., discarding), implementing, indicating, marking, modifying, mutating, ORing, performing, reaching, reading, receiving, reclaiming, recording, relying, residing, setting, sign-extending, sweeping, synchronizing, treating, using, writing, zeroing (and addresses, addressed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the *In re Nuijten* case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; may be further characterized in some situations as a development environment or a production environment, for example 102 computer system, also referred to as computational system or computing system 104 users 106 peripherals 108 network generally 110 processor 112 computer-readable storage medium, e.g., RAM, hard disks 114 removable configured computer-readable storage medium 116 instructions executable with processor; may be on removable storage media or in other memory (volatile or non-volatile or both); includes in particular CAS instructions and non-CAS instructions as discussed herein 118 data, e.g., data value(s) stored in a data location 120 kernel(s), e.g., operating system(s), BIOS, device drivers 122 tools, e.g., anti-virus software, firewalls, packet sniffer software, intrusion detection systems (IDS), intrusion prevention systems (IPS), software development tools and tool suites, hardware development tools and tool suites 124 applications, e.g., word processors, web browsers, spreadsheets, games, email tools, web apps 126 display screens, also referred to as "displays"

128 computing hardware not otherwise associated with a reference number 106, 108, 110, 112, 114

200 system enhanced by CAS-less garbage collection marking functionality

202 CAS-less garbage collection marking functionality in any form described herein 204 processor instruction set 206 garbage collector, also referred to as "GC" or as "garbage collector code"

208 GC thread, namely, a thread which is at least primarily (over 50% of instructions) dedicated to garbage collector code 210 mutator thread, namely, a thread which is at least primarily (over 50% of instructions) dedicated to code other than garbage collector code; a mutator thread is often a user thread but may also be a kernel thread; "mutator" in the term indicates that the mutator thread may mutate (i.e., change) addresses which are used during garbage collection 212 read barrier, e.g., code or another mechanism which ensures that a processor has performed specified read operations before it performs a read operation that is positioned after the read barrier; "read barrier" may also refer more generally to code that is subject to or relies upon a read barrier 214 addressable unit of memory, e.g., a byte or word which has its own memory address 216 pointer; note that a particular definition of "pointer" is used herein, unlike other documents which use "pointer" and "address" as synonyms; per FIG. 2, FIG. 7, and other descriptions provided herein, a "pointer" has an address portion and also has a distinct garbage collection portion; "pointer" and "reference" are used herein as synonyms 218 garbage collection portion of pointer 220 reference mark bit or other special bit in partitioned pointer used for garbage collection (GC); the reference mark bit may be set to indicate that further GC processing is called for, e.g., it may mark a pointer to an object that is to be compacted; one alternative name for the reference mark bit 220 in some compacting garbage collectors is the "needs relocation bit" or "NRB", to indicate checking for relocation in a later stage of GC after marking 222 address portion of pointer 224 address value, e.g., a physical address or a virtual address stored in a pointer's address portion 226 heap portion of memory, often referred to simply as the "heap"

228 record of modification made to something in the heap; the record does not necessarily specify the precise modification made or the precise location at which the modification was made, but does indicate something in the heap was modified; modifications are also referred to as "mods"

230 kernel address space 232 user (non-kernel) address space 234 recorder which records heap modifications by creating or updating heap modification records 228

Figure 3:
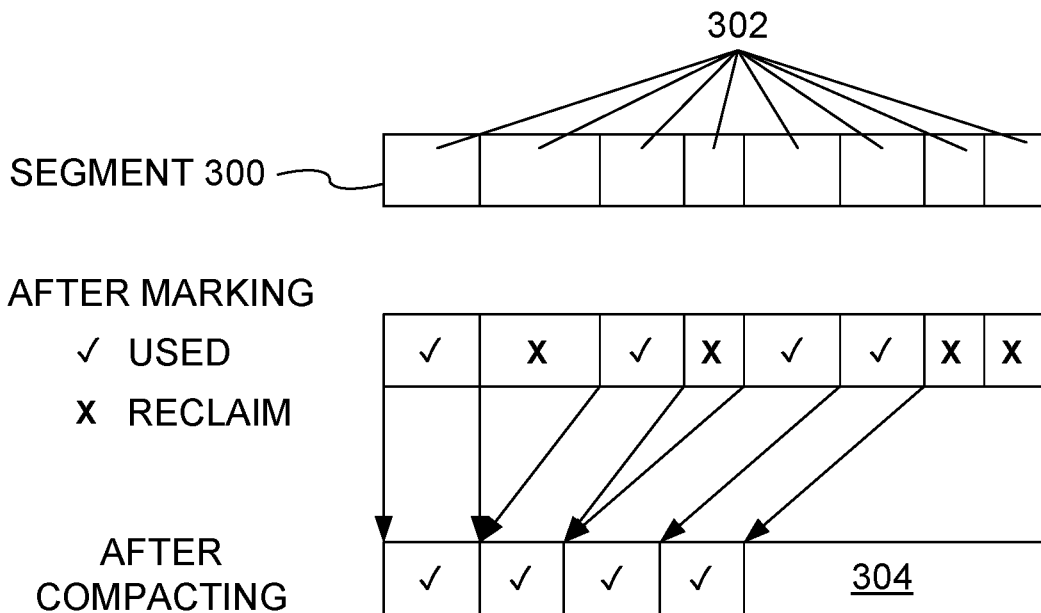
FIG. 3 is block diagram illustrating aspects of memory status at different points in time during garbage collection.

236 garbage collector marking phase code 300 segment of memory, e.g., a region, page, block, or other area of memory which is managed at least in part by garbage collection 302 contiguous area of memory which has been allocated, and which is either in use or not known to be reclaimable (indicated in FIG. 3 by ✓) or else is known to be reclaimable because it is known to be no longer in use by the program that allocated it (indicated in FIG. 3 by X)

304 contiguous area of reclaimable memory resulting from compaction 400 thread generally 402 phases and sub-phases of garbage collection 500 object, e.g., object data structure allocated in a program that implements an object-oriented programming paradigm 700 bit (i.e., memory location whose capacity is one binary digit)

800 aspects of digital processors

Figure 11:
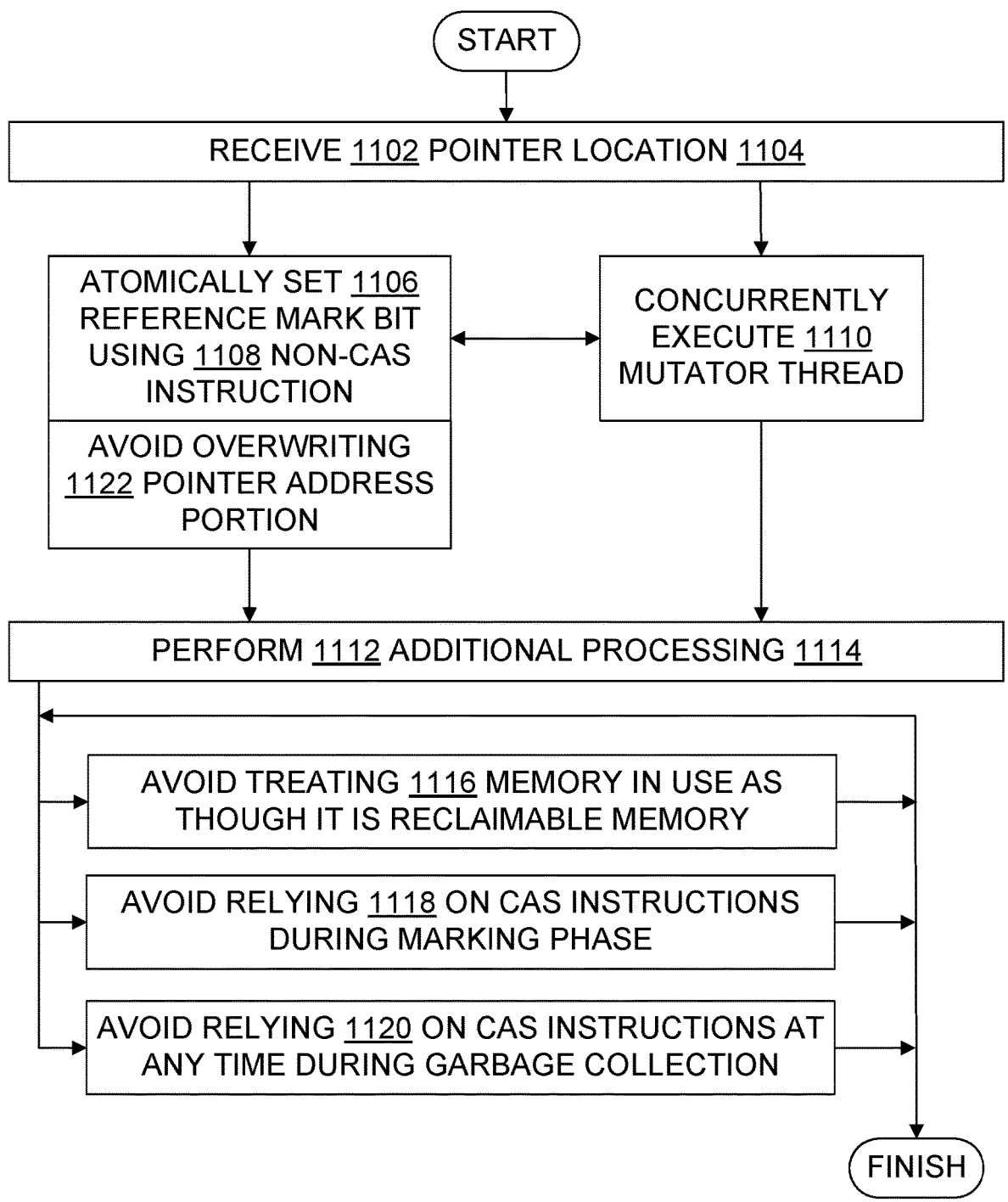
FIG. 11 is a flowchart illustrating some garbage collection processes.
Figure 12:
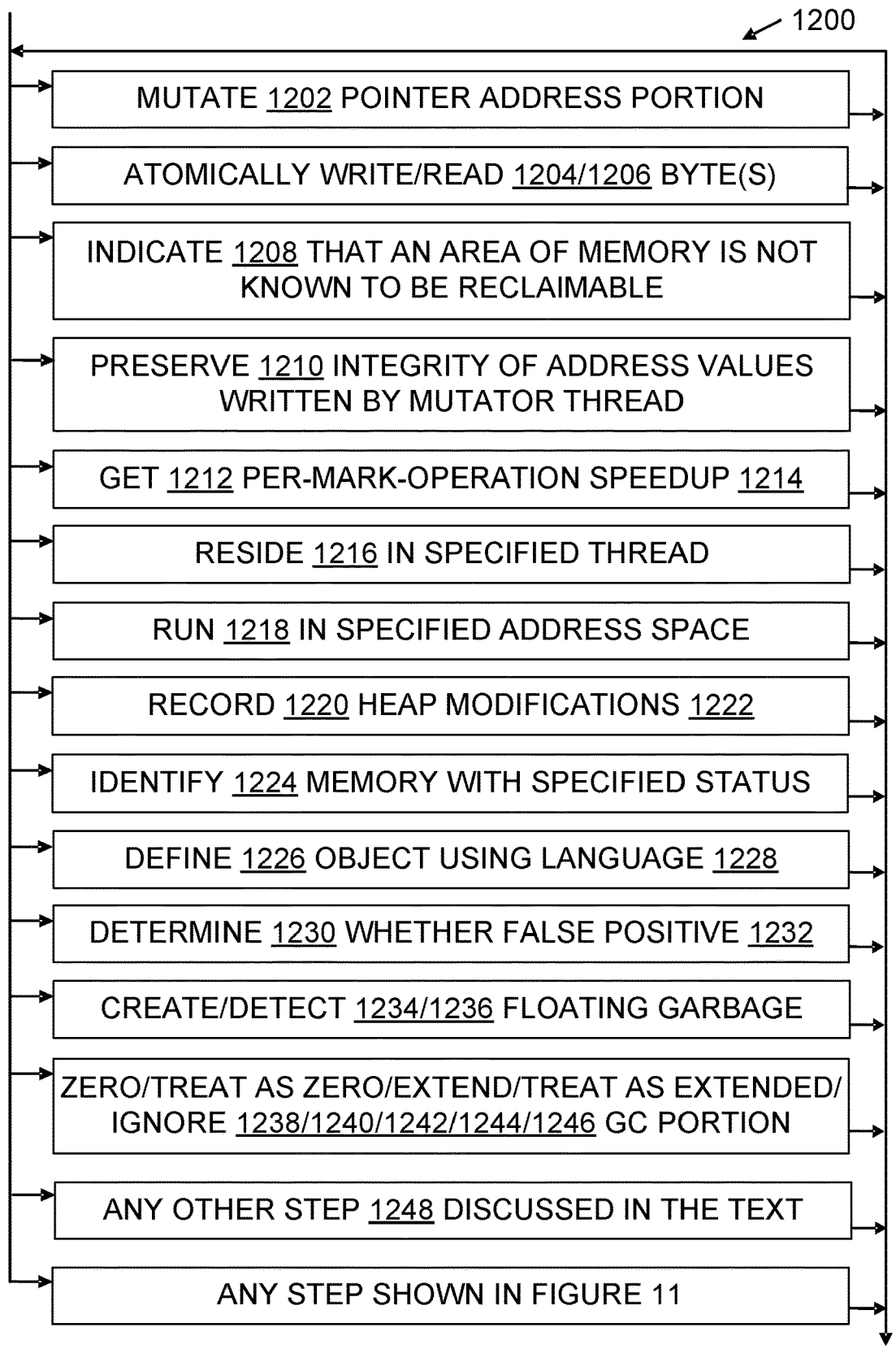
FIG. 12 is a flowchart further illustrating steps in some garbage collection or other memory management processes.

802 CAS instructions, i.e., compare-and-swap instructions, compare-and-set instructions, or both; may have different names but nonetheless function as CAS instructions; may be single instructions or a defined sequence of instructions that implement CAS functionality and have an execution cost in cycles that is within plus or minus 10% of a recognized CAS instruction 804 processor cycle count; may be determined by referring to technical documentation from a processor vendor, or by independent testing or by industry-recognized benchmarking, for example; may be exact, or be specified as a range;

may be specified as an average 806 non-CAS instructions, i.e., processor instructions which are not CAS instructions 808 logical OR instruction 810 instruction to set a particular individual bit, which is not necessarily the most significant bit in the addressable unit containing the bit 812 instruction to set the most significant bit in an addressable unit 814 non-CAS but nonetheless atomic write instruction; whether an instruction it is atomic in a given instance and hence qualifies as an instruction 814 may depend on whether the unit(s) it writes are aligned on an N-byte boundary (e.g., 32-bit boundary or 64-bit boundary, in a given system); that is, the same opcode may occur in an instruction which is atomic in some writes and non-atomic in other writes 900 aspects of garbage collection cycles 902 garbage collection cycle 904 marking phase of garbage collection 906 sweeping phase of garbage collection 908 compaction phase of garbage collection 1000 aspects of memory status with regard to garbage collection 1002 status of an area of memory with regard to garbage collection 1004 memory is reachable and those known to be in use 1006 memory is unreachable 1008 memory is marked as at least possibly in use 1010 memory is not marked as being at least possibly in use 1012 memory is in use 1014 memory is not in use 1016 memory is floating garbage 1100 processes (a.k.a. methods) which include steps shown in FIG. 11; also refers to the FIG. 11 flowchart illustrating these processes 1102 receive a pointer location, e.g., from code that is tracing addresses to assess reachability 1104 pointer location, e.g., the address at which the pointer is located 1106 set a reference mark bit; this is presumed to be done atomically unless expressly stated otherwise 1108 use a non-CAS instruction, i.e., execute one or more non-CAS instructions and not execute any CAS instruction 1110 execute concurrently 1112 perform garbage collection processing in addition to marking, e.g., sweep or compaction 1114 garbage collection processing in addition to marking, e.g., sweep or compaction 1116 avoid treating memory that is in use as though it is reclaimable, e.g., avoid adding memory in use to a pool of memory that is made available for allocation 1118 avoid relying on CAS instructions during marking phase, i.e., during the marking phase either run GC code that contains no CAS instruction or run GC code that contains only CAS instructions that are not actually executed or run GC code that does not execute CAS instructions in order to protect address integrity 1120 avoid relying on CAS instructions during any phase or sub-phase of a garbage collection cycle, i.e., during all of garbage collection either run GC code that contains no CAS instruction or run GC code that contains only CAS instructions that are not actually executed or run GC code that does not execute CAS instructions in order to protect address integrity 1122 avoid overwriting the address portion of a pointer when setting the reference mark bit (RMB) in the garbage collection portion of the pointer, e.g., by writing only to the byte(s) that belong to the garbage collection portion 1200 processes (a.k.a. methods) which include steps shown in FIG. 12 or FIG. 11; also refers to the FIG. 12 flowchart (and to the FIG. 11 flowchart it incorporates) illustrating these processes 1202 mutate at least the address portion of a pointer 1204 atomically write to one or more bytes of memory 1206 atomically read from one or more bytes of memory 1208 indicate that an area of memory is not known to be reclaimable, e.g., by not including it in a gathering of memory to be re-allocated 1210 preserve the integrity of addresses written by a mutator thread by either not overwriting them or by overwriting them only with the same respective address values, at least during marking (the GC may alter addresses later, e.g., during compaction)

1212 get a speed-up in execution by reducing time spent per operation, e.g., time spent per synchronization operation or per memory-area-marking operation 1214 speed-up in execution 1216 reside in a specified thread 1218 run (i.e., execute) in a specified address space 1220 record the existence (at least) of a heap modification made during garbage collection 1222 heap modification made during garbage collection 1224 identify an area of memory that has a specified status 1002, or associate a specified status 1002 with an identified area of memory 1226 define an object, e.g., by declaring the object and allocating memory to hold value(s) of the object 1228 programming language 1230 determine whether an area of memory is marked as a false positive with regard to reclamation, e.g., it is marked as in use but not actually in use 1232 false positive with regard to reclamation, i.e., characterized as in use but not actually in use (false negative means characterized as not in use but actually in use)

1234 create floating garbage 1236 detect floating garbage 1238 zero an area of memory, especially, certain bits in a pointer 1240 treat an area of memory, especially, certain bits in a pointer, as if zeroed 1242 sign-extend part of a pointer, e.g., sign-extending bit 47 in a 64-bit pointer gives bits 48-63 the same value as bit 47

1244 treat a pointer as if it's most significant portion has been sign-extended, e.g., for compatibility with software that expects such sign-extension in 8-byte variables that hold 6-byte address values 1246 ignore the value of the most significant portion (e.g., top bytes) of a pointer 1248 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

Software developers, quality assurance testers, and users performing demonstrations of enhanced debuggers are each a particular type of user 104, although it is contemplated that many users will likely be software developers, and many will be end-users of programs which rely on garbage collection for automatic memory management. Automated agents, scripts, playback software, and the like acting on behalf of one or more people may also be users 104, e.g., to facilitate testing a system 102, but users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment 128 can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific configurations, implementations, arrangements, displays, features, groupings, approaches, languages, or scenarios provided herein. A given embodiment may include additional or different technical features, mechanisms, sequences, components, or data structures, for instance, and may otherwise depart from the examples provided herein.

Figure 2:
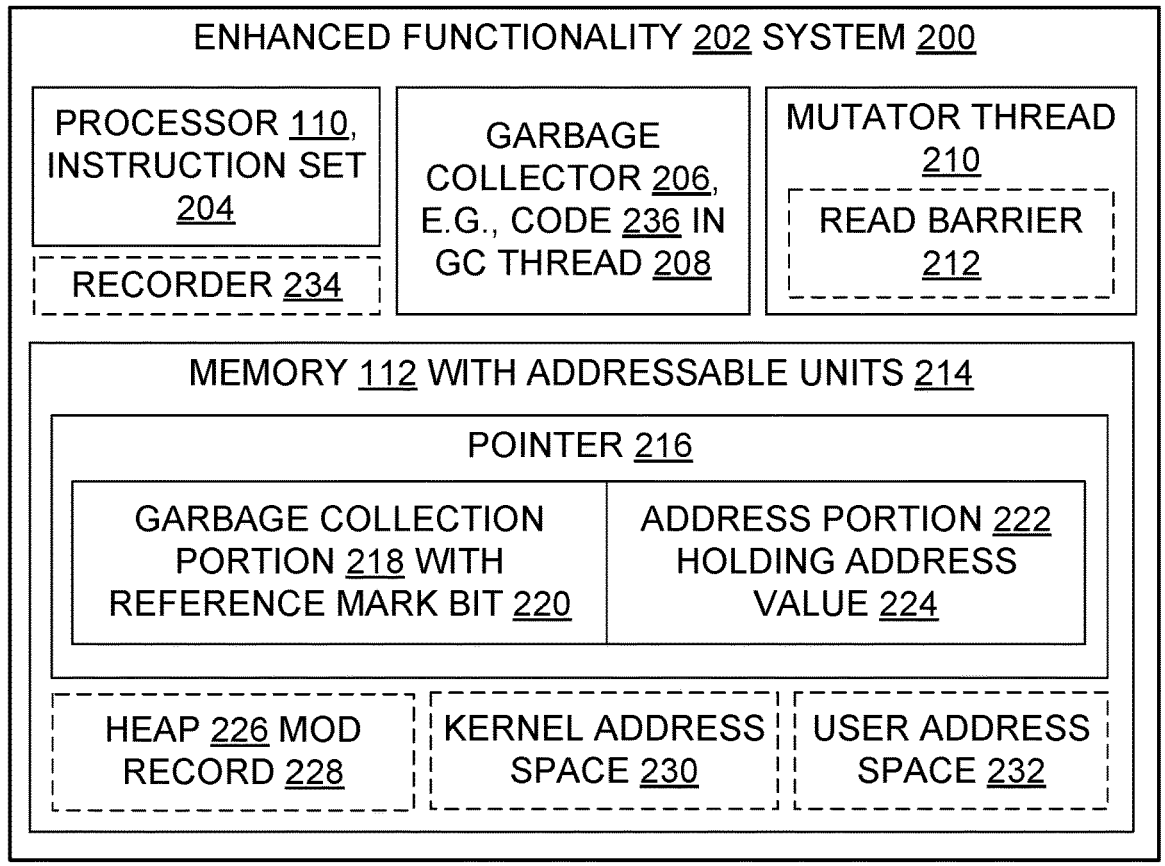
FIG. 2 is a block diagram illustrating aspects of an enhanced computing system which includes CAS-avoidant garbage collection functionality.

FIG. 2 illustrates aspects of some architectures that are suitable for some embodiments taught herein. An enhanced system 200 is system 102 enhanced by the addition of CAS-less garbage collection functionality 202 as described herein. In particular, the illustrated enhanced system 200 includes a garbage collector 206, in a GC thread 208 or a read barrier 212 or both, which does not rely on CAS instructions of the processor instruction set 204 to perform at least a part of the garbage collection cycle. This allows the garbage collector 206 to run concurrently with one or more mutator threads 210, collecting memory for reclamation, without the execution overhead of CAS instructions but also without risking the integrity of address values 224 in pointers 216. This is accomplished at least in part by non-CAS atomic writes to set reference mark bits 220 in pointer GC portions 218, which do not overlap GC address portions 222. The mutator threads 210 will in many cases be user threads, i.e., threads running in a user address space 232, but the same techniques taught herein can be applied to garbage collection performed on threads that run in a kernel address space 230.

FIGS. 3 through 6 illustrate aspects of garbage collection. Some of these aspects are familiar, or occur in familiar garbage collection activities, but their relevance to teachings herein becomes clear only after one understands innovative non-CAS garbage collection.

As illustrated in FIG. 3, garbage collection code operates on segments 300 of memory 112 which are divided by program execution into contiguous areas 302. A given area 302 may be clearly in use by one or more mutator threads, as indicated by the check mark symbol in FIG. 3, and hence be off-limits for reclamation. A given area 302 may also be clearly not in use, and hence reclaimable, as indicated by the X marks in FIG. 3. The reclaimability of an area 302 may also be undetermined.

Garbage collection generally involves tracing addresses or otherwise determining a memory area's in-use-or-not status, and marking the memory area (or a data structure that represents the areas) accordingly. Some garbage collectors leave the marked areas in place where they are found, and then programs are allocated memory out of the reclaimable areas. This approach is taken in so-called mark-sweep garbage collection algorithms. Other garbage collectors relocate used areas or relocate reclaimable areas, or do both, in order to compact together multiple areas that have the same reclaimability status. This approach, known as a mark-compaction, often produces larger reclaimable areas 304 than the mark-sweep approach but has greater complexity due to the requirement of correctly updating addresses to match the compaction results.

Figure 4:
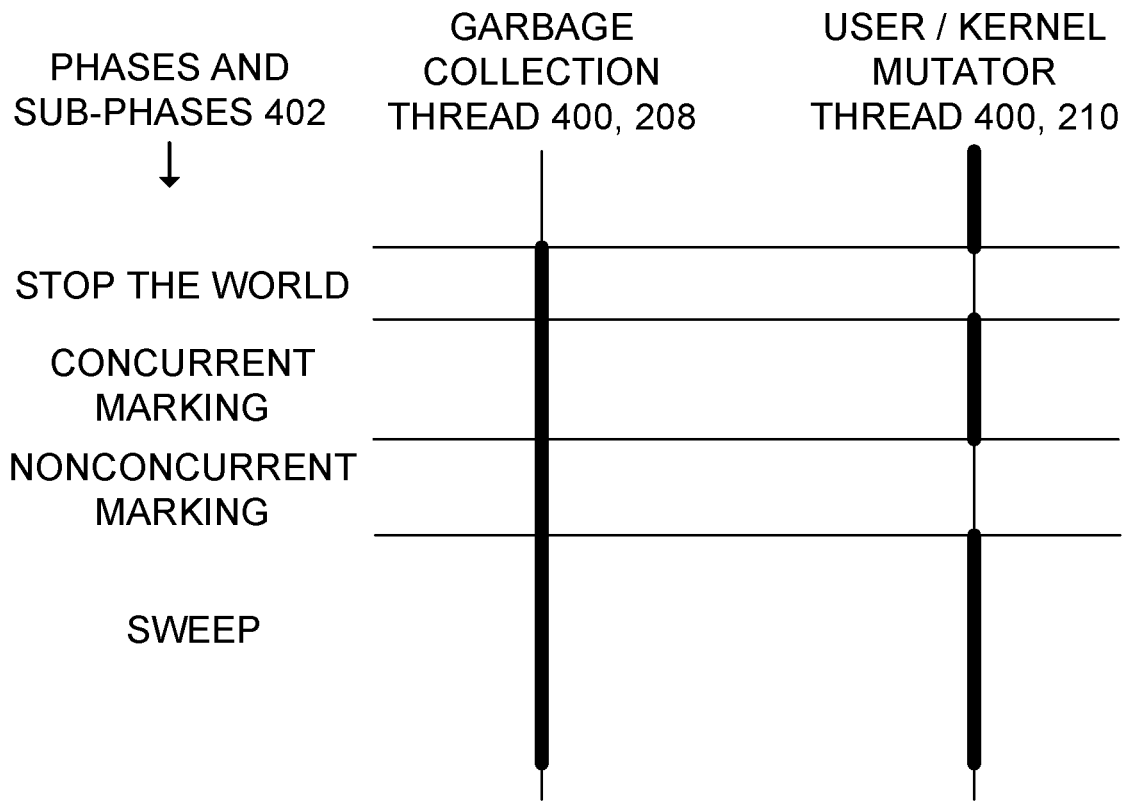
FIG. 4 is a diagram illustrating concurrent execution of a garbage collection thread and a mutator thread.

FIG. 4 illustrates phases or sub-phases 402 of garbage collection, and their relationship to concurrency when there is some concurrency. A simple approach to garbage collection is to simply suspend everything except the garbage collector while the garbage collector marks memory areas as in-use or reclaimable. However, such a full-on "stop the world" approach is not acceptable in most systems because it degrades user program performance too severely. Accordingly, a garbage collector may be designed with a goal of limiting any "stop the world" sub-phase 402 by allowing concurrent execution of a garbage collection thread 208 and any mutator thread(s) 210. The marking phase may be sub-divided into a concurrent portion and a nonconcurrent portion. Usage of CAS instructions tends to increase the time spent in nonconcurrent marking, whereas usage of non-CAS atomic writes as taught herein tends to increase concurrency during marking, and hence tends to improve the performance of user code that is subject to garbage collection.

Although concurrency involves at least two threads overlapping in execution at least part of the time, concurrency does not require that both threads always start together or suspend together or stop together. In general, when for threads run concurrently, there are at least two processor cores. But even with only one processor concurrency issues may arise if the marking thread 208 writes to the entire pointer, e.g., writes to a whole 64-bit pointer, e.g., as

[address|NRB]. So long as the mark thread 208 writes a complete reference value back into a reference 216, the mark thread can race with a mutator thread that's also modifying the reference. For example, consider:

*u*int8_*t*\*ref=\*address_of_ref;

\*address_of_ref=(ref|NRB);

These two lines are not collectively atomic, so a write could happen in between them, even on a single-processor machine.

Figure 5:
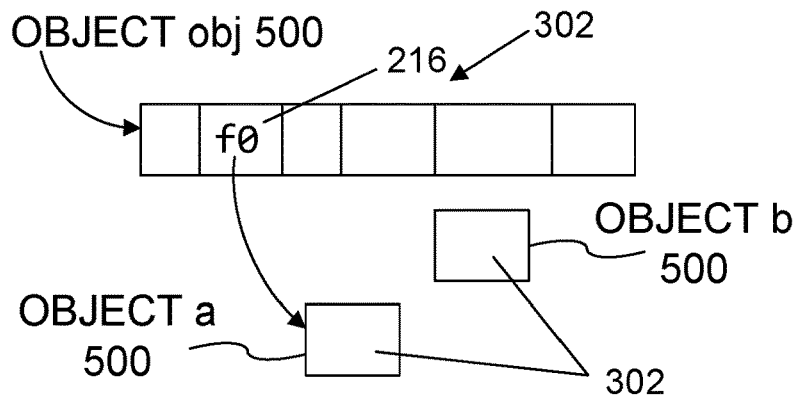
FIGS. 5 and 6 are diagrams illustrating mutation of an address during a marking phase of garbage collection.
Figure 6:
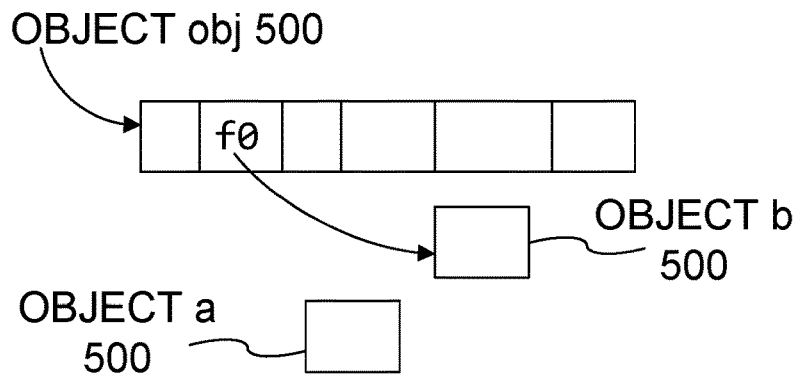

FIGS. 5 and 6 illustrate mutation of an address during the marking phase. In these two Figures, the memory areas 302 include three objects 500, named "obj", "a", and "b". Object obj includes a pointer, named f0. In FIG. 5, the address portion of f0 points to object a. Then the address is mutated, e.g., by a mutator thread, so that the f0 address points to object b, as shown in FIG. 6.

As an aside, one of skill will recognize that the phrasing used here reflects the partitioning of pointers into a GC portion and an address portion. If there were no functional GC portion, as occurs in familiar systems, then the pointer and its address would be conflated. One would say that "f0 points to object a" instead of saying that "the address portion of f0 points to object a."

As another aside, one of skill will recognize that although FIGS. 5 and 6 have arrows pointing to one edge of a given object, which suggests the address used to identify the object is the address of the first byte of the object, in practice some implementations of object-oriented programming use addresses that identify a nonzero offset into the area 302 allocated to an object. For instance, the address may point to a byte that follows a predefined header section containing type information or other metadata. Teachings herein may be adapted accordingly by one of skill.

Figure 7:
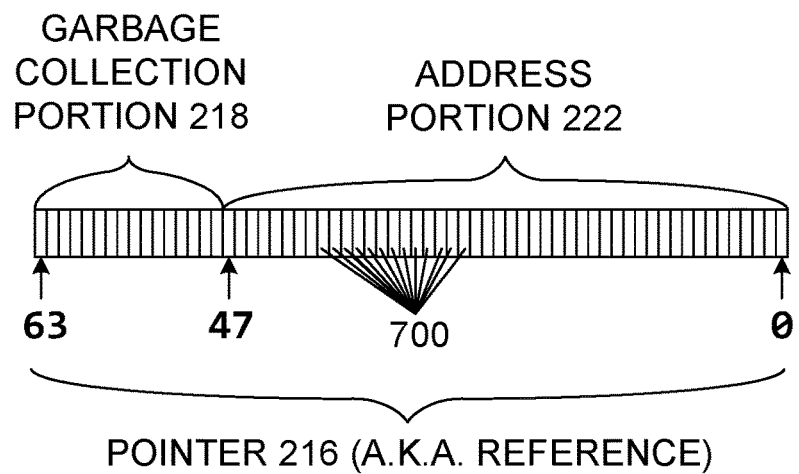
FIG. 7 is a diagram illustrating identification of specific bits and specific portions in a 64-bit pointer.

FIG. 7 illustrates the partitioning of a pointer 216 into a GC portion 218 and an address portion 222 when the pointer has 64 bits and when 48 bits are dedicated to hold the address value stored in the pointer. One of skill will recognize that although FIG. 7 suggests an arrangement in which bits decrease steadily in significance from a most significant bit 63 at the left end to a least significant bit 0 at the right end, the teachings herein apply regardless of whether a system follows a big-endian format or a little-endian format with respect to bytes, or bits within a byte, or either, or both. One of skill will also recognize that when the address portion 222 has multiple addressable units 214, e.g., the top two bytes in a 64-bit pointer, then the marking phase code 236 can any one or more of those units 214, e.g., code 236 can write to either one of the high bytes of the 64-bit pointer when any of the most significant 16 bits can be used to hold the reference mark bit 220. More generally, an address portion 222 may include one or more addressable units 214 (e.g., one or more bytes), and a GC portion 220 may also include one or more addressable units 214 (e.g., one or more bytes), in a particular embodiment.

Figure 8:
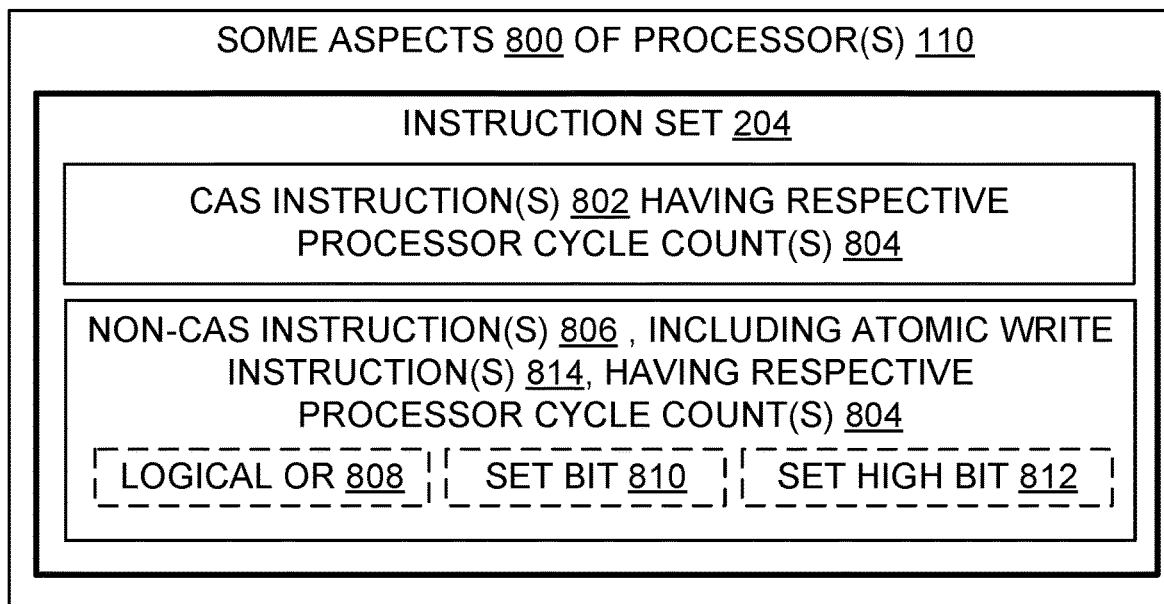
FIG. 8 is block diagram illustrating aspects of processors, and in particular aspects of processor instruction sets.

FIG. 8 illustrates some aspects 800 of processors 110 that have particular relevance to CAS-less garbage collection. Processors may include CAS instructions 802 and non-CAS instructions 806. In many x86 and Itanium® (mark of Intel Corporation) processor architectures, for instance, CAS instructions include a CMPXCHG instruction. LOCK XCHG is another example of a CAS instruction. Compare-and-swap (and compare-and-swap-double) instructions have been part of the IBM 370 architecture successor architectures since 1970. These are merely some examples. However, not every processor architecture supports CAS processor instructions. The SPARC 32 and PA-RISC architectures do not support CAS in the form of hardware instructions.

Non-CAS instructions include in particular atomic write instructions 814. These are instructions that atomically (at least when suitable byte alignment is used) write to one or more bytes (the number of bytes written depends on the particular instruction and operands). With suitable alignment, some examples of non-CAS atomic write instructions 814 in a given system may include IA-64 ST (store) instructions and x86 MOV instructions. These are merely some examples, not meant to exclude other atomic write instructions 814.

One of skill will recognize at least two kinds of atomic instruction. A first kind is CAS instructions 802, which some embodiments exclude from use for marking. A second kind is some other write instruction 814 that is "exclusive of any CAS instruction". The second kind may be referred to as a "normal write", meaning a write which is used routinely without regard to synchronization capabilities. The second kind of atomic write 814 may also be described as "any non-CAS instruction that writes one or more bytes without permitting torn writes."

Some other instructions of interest include logical OR instructions 80, bit setting instructions 810, e.g., x86 BTS (bit test and set) instructions, and instructions 812 which set the high bit of an addressable unit 214.

Figure 9:
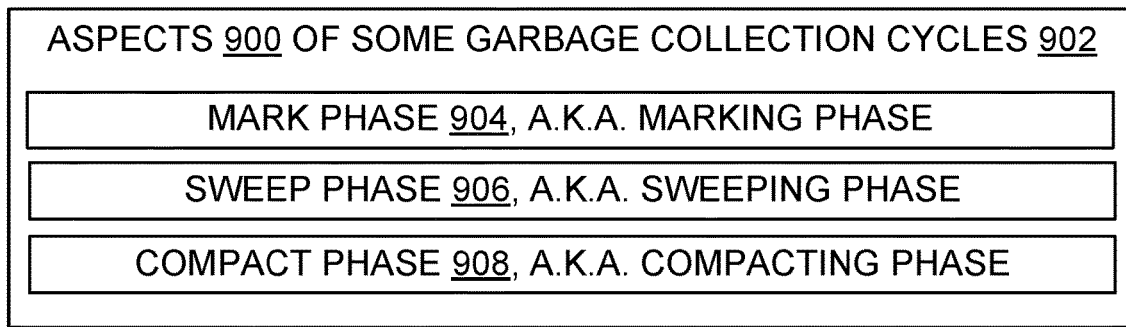
FIG. 9 is block diagram illustrating aspects of garbage collection cycles.

FIG. 9 shows some specific phases in a garbage collection cycle 902, including a marking phase 904, a sweep phase 906, and a compacting phase 908. During marking 904, reachable objects 500 or other non-reclaimable areas of memory are marked, either in place or in a data structure which represents them. During the sweep 906, reclaimable objects are cleared from the heap, e.g., placed in a pool for reallocation. During compacting 908, reclaimable areas are placed together; this may also be viewed as placing used areas together. A given garbage collector does not necessarily perform each phase, e.g., sometimes compaction 908 is omitted.

Figure 10:
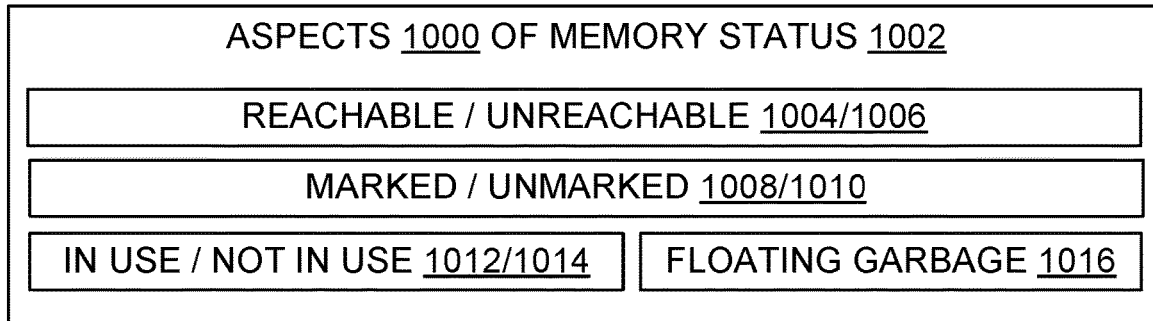
FIG. 10 is block diagram illustrating aspects of memory status with regard to garbage collection.

FIG. 10 shows some examples of memory status 1002 that are relevant to garbage collection. An area of memory may be reachable 1004 and hence in use 1012, and may be marked 1008 as such. Another area of memory may be unreachable 1006, and thus not in use 1014. Floating garbage 1016 is an area of memory that is not in use 1014, but not yet specifically identified as reclaimable.

Some embodiments use or provide a system 200 which avoids reliance on processor CAS instructions 802 for garbage collection marking. The avoided CAS instructions include one or more compare-and-swap instructions or compare-and-set instructions. The system includes a memory 112 having addressable units 214, with each addressable unit being individually addressable using a respective address value 224. One or more pointers 216 reside in the memory 112, with each pointer residing in at least two addressable units 214, e.g., pointers 216 generally occupy at least two bytes and may occupy more. Each pointer 216 has an address portion 222 which holds an address value and a garbage collection portion 218 which is exclusive of the address portion.

In these embodiments, a processor 110 is in operable communication with the memory 112. The processor 110 has an instruction set 204 which includes at least one write instruction 814. Upon execution, this write instruction 814 atomically writes a value to at least one addressable unit, e.g., to the garbage collection portion 218 of a pointer 216.

This write instruction 814 is exclusive of any CAS instruction, i.e., it is not a CAS instruction 802, i.e., it is a non-CAS instruction 806.

In these embodiments, a mutator thread 210 executes. Upon execution the mutator thread 210 mutates at least one or more address values of one or more respective pointers. In addition to mutating the address, the mutator thread 210 may also mutate the garbage collection portion 218 of the pointer 216, e.g., by writing 64 bits of data to a pointer which holds a 48-bit address value.

In these embodiments, a garbage collector 206 runs concurrently with the mutator thread 210 during a garbage collection marking phase 904. The garbage collector 206 uses the write instruction 814 to atomically set a reference mark bit 220 in the garbage collection portion 218 of the pointer 216, as an indication that the address portion 222 of the pointer identified an area 302 of memory 112 that was not available for reclamation when reclaimability was last checked. The system 200 performs the garbage collection marking phase 904 while preserving the integrity of address values 224 that are written by the mutator thread 210, and does so without reliance on CAS instructions 802 for synchronization, even though the mutator thread 210 and the garbage collector 206 run concurrently with each other. In some embodiments, the reference mark bit 220 is not necessarily used for reclamation purposes, although it can be. It may be a bit that tells a later (after marking) phase of the GC that this reference (i.e., pointer) should undergo additional processing, e.g., to be relocated.

In some embodiments, the write instruction 814 used to atomically set the reference mark bit has an average processor cycle count 804 that is denoted here as write-average. The avoided CAS instructions of the processor instruction set 204 include a fastest avoided CAS instruction 802 which has an average processor cycle count 804 that is denoted here as CAS-average. As a measure of the execution efficiency gained by substituting non-CAS instructions for CAS instructions according to the teachings herein, in some systems CAS-average is at least twice write-average. In some, CAS-average is at least three times write-average. In some, CAS-average is at least five times write-average. Accordingly, some systems may show an execution efficiency improvement of several percentage points. Depending on the implementation, execution may be 5%, 10%, 15%, or even more, faster than the CAS-based marking phase, or the CAS-based garbage collection overall.

In some embodiments, the garbage collector 206 includes marking phase code 236 that resides in a mutator thread read barrier 212. In some, the garbage collector includes marking phase code 236 that resides in a garbage collector thread 208. In some embodiments, part of the garbage collector 206 resides in one or more garbage collector threads 208 and another part of the garbage collector 206 resides in one or more mutator thread read barriers 212. That is, some GCs may have a read barrier 212 perform GC work, so that some of the GC work will be distributed to mutator threads 210.

In some embodiments, the pointer 216 includes at least sixty-four bits 700. In some, the garbage collection portion 218 of the pointer includes at least eight bits, and in some the garbage collection portion 218 of the pointer includes at least 16 bits. More generally, as long as at least one addressable unit 214 is not required for addresses and can be used to hold a reference mark bit 220, teachings herein may be beneficially applied. For example, if address values 224 in a 32-bit system only need 24 bits, then the remaining byte could be used as a GC portion 218.

In some embodiments, the system 200 includes at least two mutator threads 210, each of which runs concurrently with the garbage collector during the garbage collection marking phase. In some of these, two or more mutator threads 210 upon execution mutate one or more address values 224 of one or more respective pointers 216. One of skill will recognize that concurrency is possible even with only one mutator thread, when a garbage collector thread is also present. Also, concurrency issues may arise when only a single processor is present, when two threads sharing that processor also share access to a pointer 216.

In some embodiments, the mutator thread 210 runs in a kernel address space 230. In some, the mutator thread 210 runs in a user address space 232. In some embodiments, the system 200 includes a mutated pointer recorder 234 which upon execution records respective identifiers of one or more pointers 216 when a respective address was mutated by the mutator thread during the garbage collection marking phase. The mutated pointer recorder may aid identification of unreachable unmarked areas of memory, for example, by supporting processing to locate floating garbage. The mutated pointer recorder 234 could be implemented in a given system using a write barrier to reduce the memory reclamation impact of heap modification. The mutated pointer recorder 234 could be implemented using one or more of: logging, bitmaps, virtual memory managers, and Win32 API GetWriteWatch( ) code. One of skill will acknowledge that one of the purposes of recording is so that when the heap modifications are processed later, an opportunity is provided to set the reference mark bit 220, if called for by the circumstances.

In some embodiments, the address portion 222 of the pointer 216 identified an area 302 of memory 112 that held or holds an object 500 that has been defined by a program 124 implemented in an object-oriented programming language 1228.

Other system embodiments are also described herein, either directly or derivable as system versions of described methods or configured media, informed by the extensive discussion herein of computing hardware.

Methods

Technical methods shown in the Figures or otherwise disclosed will be performed automatically, e.g., by an enhanced system 200 which utilizes partitioned pointers 216 and CAS-less marking phase code 236, unless otherwise indicated. Methods may also be performed in part automatically and in part manually to the extent action by a human administrator or other human person is implicated, e.g., by launching a program 124 known to rely upon garbage collection in a system 200. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 11 and 12. Steps may be performed serially, in a partially overlapping manner, or fully in parallel. In particular, the order in which the flowchart 1200 is traversed to indicate the steps performed during a method may vary from one performance of the method to another performance of the method. The flowchart traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

Some embodiments provide or use a garbage collection process which avoids reliance on processor CAS instructions 802 during a marking phase 904. The avoided CAS instructions 802 include one or more compare-and-swap instructions or compare-and-set instructions. The process is performed by code 206, 208 executing in a computing system 200, and the process includes a garbage collector 206 receiving 1102 locations 1104 of one or more pointers 216 which reside in a digital memory 112 of the computing system 200. Each pointer 216 of interest has an address portion 222 which holds an address value 224 and a garbage collection portion 218 which is exclusive of the address portion. A mutator thread 210 is executing 1110 concurrently with the garbage collector and has access to at least the address portion of at least one of the pointers. The garbage collector is using 1108 a non-CAS write instruction 814 to atomically set 1106 a reference mark bit 220 in the garbage collection portion of a pointer without overwriting 1122 the address portion of the pointer. The set reference mark bit indicates that the address portion of the pointer currently identifies an area of the memory for subsequent garbage collection processing, or that the address portion at least identified such an area recently (since the address may have been mutated unbeknownst to the marking code 236). The process performs the garbage collection marking phase 904 while preserving 1210 the integrity of address values 224, without reliance 1118 on CAS instructions, even though the mutator thread 210 and the garbage collector 206 execute concurrently 1110 with each other. Similar execution efficiency improvements and other optimizations may be obtained throughout the garbage collector 206 in some embodiments, e.g., during the compaction phase 908, by likewise replacing CAS instruction 802 manipulation of addresses with non-CAS instructions 814 that use one or more bits 700 which are not needed to hold the manipulated address values 224.

In some embodiments, the garbage collector using 1108 a non-CAS write instruction to atomically set 1106 the reference mark bit in the garbage collection portion of a pointer includes: atomically reading 1206 a byte value from the garbage collection portion of the pointer into a variable, said variable denoted here as GCportion; setting 1106 the reference mark bit in GCportion; and then using 1108 the non-CAS write instruction to atomically write 1204 the value from GCportion back into the garbage collection portion of the pointer 216. In some cases, as illustrated in FIGS. 5 and 6 or in other configurations, the mutator thread mutates 1202 at least the address portion of the pointer after said atomically reading 1206 a byte value and before said using the non-CAS write instruction to atomically write 1204 the value, and the process further includes recording 1220 an identifier of the pointer to support subsequent determination 1114 of whether the mutated pointer actually requires subsequent processing. The recorded identifier 228 may include a memory address, an offset, a page identity, a block identifier, or another memory segment 300 or area 302 identifier, for example. One of skill will acknowledge that the mutator does not write only an address portion, but instead writes the entire pointer. Thus, stating that the mutator writes "at least" the address portion could create confusion by implying the GC portion is not overwritten by the mutator. However, it may properly be stated that the mutator mutates "at least" the address portion because "mutate" means "changes the value of", and a mutator write to the GC portion could (inadvertently and unreliably) leave the value of the reference mark bit (or the entire GC portion) unchanged.

Actions that are safe within the garbage collector are not necessarily safe in general. One of skill will acknowledge there may be substantial risk to data integrity and availability by naively exposing pointers 216 as used herein to any code whose design and implementation is not informed by the teachings provided herein. Pointers 216 as taught herein are partitioned physically into a GC portion and an address portion. The GC code 236 is tailored to recognize such partitioning and to avoid harmful overwrites of either part of the pointer, as discussed herein. The same tailoring is not likely to be present in code generally. So it may be prudent or even necessary to transform pointers 216 into a format that will be accepted without error by code generally on a given system. This transformation may be accomplished by performing steps such as one or more of steps 1238-1246 before execution control is passed from GC code 236 to the code generally (that is, code 120, 122, 124, or 210).

In particular, one or more of steps 1238-1246 may be prudent or necessary in some embodiments to safely enclose the execution scope of pointers 216 and code 236. Such enclosure may be provided by the garbage collector 206 to avoid runtime errors that would arise from some other piece of code mistaking a set reference mark bit for part of an address value and thus attempting instruction execution with an address value which is larger than the largest allowable address value in the system in question.

Accordingly, in some embodiments the process further includes at least one of the following actions performed before passing control to code generally (e.g., code 120, 122, 124, or 210) that is executing in the computing system 200: treating 1240 the garbage collection portion of the pointer as if it contains all zeros; zeroing 1238 the garbage collection portion of the pointer; treating 1244 the garbage collection portion of the pointer as if it is sign-extended according to the most significant bit of the address portion of the pointer; sign-extending 1242 the most significant bit of the address portion of the pointer through the garbage collection portion of the pointer; or ignoring 1246 the garbage collection portion of a pointer when using the address portion of the pointer. One of skill will acknowledge that sign-extension is one way to place a pointer in a canonical form.

Some embodiments include code 234 executing in the computing system recording 1220 respective identifiers 228 of one or more pointers, each of whose respective address was mutated 1202 by the mutator thread during the garbage collection marking phase 904. Such recording aids automatic identification 1114 of unreachable unmarked areas of the memory.

In some embodiments, the mutator thread executes 1110 in a user address space 232. In some, the mutator thread executes 1110 in a kernel address space 230. In some, at least one mutator thread executes 1110 in each kind of address space 230 and 232.

Some embodiments may include a processor 110 that is more efficient when writing one particular bit than it is when writing another particular bit. For example, a write instruction 814 that sets the most significant bit may be more efficient than the same instruction, or another instruction, that sets a less significant bit. For this or other reasons, in some embodiments the garbage collector uses 1108 the non-CAS write instruction to atomically set 1106 the most significant bit of the pointer 216 as the reference mark bit 220.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as partitioned pointers 216, CAS-less marking phase code 236, and reference mark bits 220, in the form of data 118 and instructions 116, read from a removable storage medium 114 and/or another source such as a network connection, to form a configured storage medium. The configured storage medium 112 is capable of causing a computer system to perform technical process steps for CAS-less garbage collection operations, as disclosed herein. The Figures thus help illustrate configured storage media embodiments and process embodiments, as well as system and process embodiments. In particular, any of the process steps illustrated in FIG. 11 or 12, or otherwise taught herein, may be used to help configure a storage medium to form a configured storage medium embodiment.

Some embodiments provide or use a storage medium 114 configured with code which upon execution by one or more processors 110 performs a garbage collection process that avoids reliance on processor CAS instructions 802 during a marking phase 904 in a computing system. The avoided CAS instructions include one or more compare-and-swap instructions or compare-and-set instructions. The process includes a garbage collector receiving 1102 locations of one or more pointers which reside in a digital memory of the computing system, each pointer having an address portion which holds an address value and a garbage collection portion which is exclusive of the address portion; a mutator thread executing 1110 concurrently with the garbage collector and having access to at least the address portion of at least one of the pointers; the garbage collector using 1108 a non-CAS write instruction to mark an area of the memory by atomically setting 1106 a reference mark bit in the garbage collection portion of a pointer whose address identifies the area of memory, without said setting overwriting 1122 the address; and avoiding treating 1116 as reclaimable memory any area of the memory which is still in use by at least one user space thread. The process performs the garbage collection marking phase without reliance on CAS instructions. As used here, "access" means read access or write access or both.

In some embodiments, using 1108 a non-CAS write instruction to atomically set the reference mark bit includes: atomically reading 1206 a byte value from the garbage collection portion of the pointer into a variable, said variable denoted here as GCportion; setting 1106 the reference mark bit in GCportion; and then using the non-CAS write instruction to atomically write 1204 the value from GCportion back into the garbage collection portion of the pointer.

In some embodiments, atomically setting 1106 the reference mark bit takes a number of processor cycles 804 that is denoted here as write-count, the avoided CAS instructions include a fastest avoided CAS instruction which has a published processor cycle count 804 that is denoted here as CAS-count, and CAS-count is at least three times write-count.

In some embodiments, the process includes creating 1234 a floating garbage area 1016 of memory during a given garbage collection cycle 902, and then reclaiming 1114 the floating garbage area of memory for reuse during a subsequent garbage collection cycle.

In some embodiments, setting 1106 the reference mark bit includes at least one of the following: executing 1110 a processor instruction 808 which performs a logical OR operation, or executing 1110 a processor instruction 812 which performs an operation that sets the most significant bit of an addressable unit of the memory.

Additional Considerations About the Special Bit 220

One of skill will acknowledge that the reference mark bit 220 may be named differently in different embodiments, and also that the meaning and functionality of the special bit may differ between embodiments. For example, one alternative name for the reference mark bit 220 in some compacting garbage collectors is the "needs relocation bit" or "NRB". This usage is not for liveness per se but rather for checking for relocation which is a later stage 1114 of GC.

Another embodiment may refer to a "liveness bit". The "liveness bit" being set could mean a whole object is alive (still in use 1012). Suppose a garbage collector runs concurrently with the mutator thread during a garbage collection marking phase and uses the write instruction to atomically set a liveness bit in the garbage collection portion of a pointer. In some embodiments, this would mean more than just the liveness per se, because an object has to be live for any of the references it contains to have this bit on at all. In the concurrent compacting GC case it would mean this reference will need to be relocated. That is, the bit would indicate additional processing 1114 should be performed during a later part of the GC.

In some embodiments, the RMB/NRB/liveness bit 220 provides information that relates to floating garbage 1016 and in-use false positives. Floating garbage is an area X of memory that is both unreachable (i.e., X is no longer in use, and therefore is OK to reclaim) and unmarked (i.e., there is no pointer whose liveness bit is set and whose address is the address of area X). With reference to FIGS. 5 and 6, suppose a pointer f0 contains the address of object a when the garbage collector reads the garbage collection portion of f0, and then the mutator thread mutates f0 so the address in f0 is the address of object b, and then the garbage collector writes the garbage collection portion of f0 with the bit 220 set. In this case, object a has become floating garbage; it will be reclaimed at some point later by the garbage collector because nothing points to it (assuming that f0 before the mutation was the only pointer pointing to object a). Having the bit 220 set in f0 after f0 points to object b is fine, because object b is indeed reachable (through f0). Then an in-use false positive occurs when f0 doesn't actually need this bit 220 set when it contains b.

In one scenario:
//mutator sets f0 to a obj.f0=a;

//GC thread marks and sees obj.f0

$u$int8_$t$*ref=obj.f0;

//GC figures out that the mark ref bit should be on for this reference.
//but before GC could set it, mutator changes obj.f0.
//mutator sets f0 to b which doesn't need this bit on obj.f0=b;

//this function sets the bit in the GC portion of f0 but it doesn't need to be set.
  set_gc_mark_ref_bit (&(obj.f0));

Floating garbage in this case would occur by keeping a alive because obj.f0 was (past tense) pointing to it. Suppose nothing else points to a anymore so a could be reclaimed but it's not, because obj.f0 was pointing to it and the GC already considered a live. This use of bit 220 is different from the mark reference bit 220 usage described elsewhere herein, which is for references, in that floating garbage refers to objects. Floating garbage may occur in previously known concurrent GCs, even in the non-compacting ones. One relevant aspect here is that some embodiments record 1220 the modifications 1222 to the heap, so the GC can subsequently look at obj.f0 again as a result of obj.f0 being modified. At that point the GC may recognize that obj.f0 does not need the bit and the GC can clear it. In some embodiments, it may occur that the GC only ever sets this bit 220 during the mark phase but does not clear it, e.g., for performance or another reason. This situation is merely a false positive that wouldn't cause any functional problems like data integrity or availability problems caused by false negatives.

As noted elsewhere herein, in some embodiments atomically setting bit 220 includes atomically reading a byte value from the GC portion of the pointer into a single-byte variable GCportion (named thus here merely for convenience), setting the bit 220 in GCportion using a logical OR operation, and then atomically writing the value from GCportion back into the GC portion byte. The atomic read is done as a normal (non-CAS) read. In some implementations, reading a unit that's supported by the processor, such as reading a 64-bit address aligned on a 64-bit boundary, is automatically atomic.

One notation for representing this sequence is:

byte b=VA[idx];

VA[idx]=b|0x100 . . . 0;

where VA stands for "virtual address" and idx is an index into the pointer at the GC portion's byte location.
Another notation would be:

VA[idx]=0x100 . . . 0;

assuming that VA[idx] has been zeroed.

Other notations may also be used. One may use notation such as "f0|0x100 . . . 0" or "f0|reference mark bit" or "set_gc_mark_ref_bit (&(obj.f0));" to indicate that the bit 220 is set. One may also use a shorter notation, where "f0" alone means f0 without the bit 220 set and f0 with an apostrophe "f0'" means f0 with the bit 220 set. In this notation, one set of states or events of interest is:
obj.f0==a //The value of obj.f0 is a
<determine to mark> //The marking phase code determines that obj.f0 should be marked
obj.f0=b //The mutator overwrites a with b (note "==" for equality vs "=" for assignment
obj.f0=b' //The marking phase code sets the reference mark bit in obj.f0

However, in using such notation one should be clear as to which byte(s) are being written. For example, when the mark phase only sets the bit 220 by writing a single byte of obj.f0, the notation obj.f0=b' could be misinterpreted to mean writing a 64-bit value b' into obj.f0, which is not correct. To prevent misunderstanding, a discussion or implementation should be specific and clear which particular byte is being written, e.g., by specifying that only the most significant byte of the pointer is written when setting the bit 220.

Some Additional Examples and Considerations

Assume a reference (a.k.a. pointer 216) of interest is obj.f0. Then one possibility that that obj.f0 is null. In this case, the marking phase code 236 either is not given obj.f0 to mark, or else the marking phase code 236 receives obj.f0 but does not mark obj.f0 and moves on to the next pointer received for marking.

Another possibility is that the concurrency has no impact, in that the mutator thread does not overwrite obj.f0. That is, the marking phase code reads obj.f0 into a register (or other location), sets the reference mark bit, and uses a normal write to atomically put the value [obj.f0|reference mark bit] back into obj.f0 without any intervening write to ob.f0 by the mutator. This results in no floating garbage and no false positive. However, in practice the marking phase code will not know in advance whether the mutator will mutate obj.f0, so the code 236 should be designed and implemented to handle concurrent mutation, e.g., as illustrated and discussed in connection with FIGS. 5 and 6. Unless one specifies that the mutator cannot run during marking, marking code should anticipate that there might be a write from the mutator. In particular, which marking code 236 should not do a destructive write to all bits of a pointer 216. Marking code only alters the GC portion of the pointer.

Accordingly, consider the cases in which concurrency has impact. Suppose obj.f0 has value a. Next, the marking phase code determines that obj.f0 should be marked, based on value a. But then the mutator overwrites obj.f0, so now obj.f0 has value b. Then the marking phase code marks b. That is, the marking phase code sets the reference mark bit in obj.f0 so that obj f0 has the value [b|reference mark bit]. This situation in turn has two possibilities: either b should be marked or b should not be marked. If b should be marked, well, b is marked, so marked b is not a false positive. However the memory at a could be floating garbage. If b should not be marked, well, b is marked so b is a false positive. Again, the memory at a could be floating garbage (although it is not the reference marking code 236 that creates floating garbage). One point to note is that there are no false negatives—nothing gets marked for reclamation that is still in use.

Some teachings herein support, involve, or otherwise relate to avoiding CAS instructions during a mark phase for concurrent compacting GCs. During the concurrent mark phase 904 of a concurrent compacting GC, the GC marks the reference value that points to the regions 302 that are being compacted. This may be represented as:

obj.f=obj.f|special_bit

Since the GC thread 208 runs concurrently with the mutator 210, the GC makes sure the mutator's writes do not get lost. In some familiar GCs, this involves the GC thread or a read barrier executing a CAS, which is expensive.

To understand some ways to reduce or avoid this expensive operation, note that in 64-bit references, not all 64 bits are used for a virtual address. Only the lower N bits are used and N is usually <=48. Some embodiments use a bit 220 in one of the most significant bytes as a special bit, in that the GC or read barrier can set this bit only instead of trying to overwrite the whole 64 bits for this virtual address. The writes can be logged or otherwise recorded 1220 to allow processing 1114 later to discover if this special bit still needs to be set or not. This way we the GC avoids the CAS during marking.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, according to teachings provided herein, memory reclamation is tailored to avoid certain synchronization instructions, speeding concurrent garbage collection while preserving data integrity and availability. Garbage collection reclaims objects 500 that are no longer in use, or other unused areas 302 of memory 112. Pointers 216 are partitioned into address portions 222 holding address values 224 and garbage collection portions 218 having a special bit 220. Marking code 236 writes only the garbage collection portions 218, setting the special bit 220 as a mark reference, relocation candidate, etc. Mutator threads 210 may concurrently mutate the entire pointer 216 to update the address 224, but mutation does not cause incorrect reclamations. Meanwhile, execution speed is increased by avoiding CAS (compare-and-swap instructions or compare-and-set) synchronization instructions 802 in the garbage collector 206. Non-CAS yet nonetheless atomic writes 814 are used instead. Mutators 210 run in user address space 232 or kernel address space 230. Partitioned pointers 216 and their use may be enclosed in the garbage collector using code that performs one or more transformation activities 1238-1246, to avoid runtime errors by general code (120, 122, 124, 210) that expects references to be in a canonical non-partitioned form.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 11 and 12 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system which avoids reliance on processor CAS instructions for marking a special bit of a pointer, the avoided CAS instructions including one or more compare-and-swap instructions or compare-and-set instructions, the system comprising:
   a memory having addressable units, each addressable unit being individually addressable using a respective address value;
   one or more pointers residing in the memory, each pointer residing in at least two addressable units, each pointer having an address portion which holds an address value and a non-address portion which is exclusive of the address portion;
   a processor in operable communication with the memory, the processor having an instruction set, the processor instruction set including at least one write instruction which upon execution atomically writes a value to at least one addressable unit, the write instruction exclusive of any CAS instruction;
   a mutator thread, which upon execution mutates at least one or more address values of one or more respective pointers;
   a marking code which runs concurrently with the mutator thread and uses the write instruction to atomically set the special bit in the non-address portion of a pointer;
   whereby the system preserves the integrity of address values written by the mutator thread, without reliance on CAS instructions, even though the mutator thread and the marking code run concurrently with each other.

2. The system of claim 1, wherein the write instruction used to atomically set the special bit has an average processor cycle count that is denoted here as write-average, wherein the avoided CAS instructions of the processor instruction set include a fastest avoided CAS instruction which has an average processor cycle count that is denoted here as CAS-average, and wherein CAS-average is at least twice write-average.

3. The system of claim 1, wherein at least a portion of the marking code resides in a mutator thread read barrier.

4. The system of claim 1, wherein at least a portion of the marking code resides in a garbage collector thread.

5. The system of claim 1, wherein:
   the pointer includes at least sixty-four bits, and the non-address portion of the pointer includes at least eight bits; and
   the system includes at least two mutator threads, each of which runs concurrently with the marking code, and each of which upon execution mutates one or more address values of one or more respective pointers.

6. The system of claim 1, wherein the mutator thread runs in a kernel address space.

7. The system of claim 1, wherein the system further comprises a mutated pointer recorder which upon execution records respective identifiers of one or more pointers, each of whose respective address was mutated by the mutator thread.

8. The system of claim 1, wherein the address portion of the pointer identified an area of memory that held or holds an object defined by a program implemented in an object-oriented programming language.

9. A bit marking process which avoids reliance on processor CAS instructions, the avoided CAS instructions including one or more compare-and-swap instructions or compare-and-set instructions, the process performed by code executing in a computing system, the process comprising:
   a marking code receiving locations of one or more pointers which reside in a digital memory of the computing system, each pointer having an address portion which holds an address value and a non-address portion which is exclusive of the address portion;
   a mutator thread executing concurrently with the marking code and having access to at least the address portion of at least one of the pointers;
   the marking code using a non-CAS write instruction to atomically set a bit in the non-address portion of a pointer without overwriting the address portion of the pointer;
   whereby the process performs bit marking while preserving the integrity of address values, without reliance on CAS instructions, even though the mutator thread and the marking code execute concurrently with each other.

10. The process of claim 9, wherein the marking code using a non-CAS write instruction to atomically set the bit in the non-address portion of a pointer comprises:
    atomically reading a byte value from the non-address portion of the pointer into a variable;
    setting the reference mark bit in said variable; and then
    using the non-CAS write instruction to atomically write the value from said variable back into the non-address portion of the pointer.

11. The process of claim 10, wherein the mutator thread mutates at least the address portion of the pointer after said atomically reading a byte value and before said using the non-CAS write instruction to atomically write the value, and wherein the process further comprises recording an identifier of the pointer.

12. The process of claim 9, further comprising at least one of the following actions performed by code executing in the computing system:
    treating the non-address portion of the pointer as if it contains all zeros;
    zeroing the non-address portion of the pointer;
    treating the non-address portion of the pointer as if it is sign-extended according to the most significant bit of the address portion of the pointer;
    sign-extending the most significant bit of the address portion of the pointer through the non-address portion of the pointer; or
    ignoring the non-address portion of a pointer when using the address portion of the pointer.

13. The process of claim 9, wherein the marking code uses one or more non-CAS write instructions to set multiple bits in the non-address portion of a pointer without overwriting the address portion of the pointer.

14. The process of claim 9, wherein the mutator thread executes in a user address space.

15. The process of claim 9, wherein the marking code uses the non-CAS write instruction to atomically set the most significant bit of the pointer as the bit.

16. The process of claim 9, wherein the marking code uses one or more non-CAS write instructions to set at least one bit in each of at least two bytes in the non-address portion of a pointer without overwriting the address portion of the pointer.

17. A storage medium configured with code which upon execution by one or more processors performs a bit marking process which avoids reliance on processor CAS instructions in a computing system, the avoided CAS instructions including one or more compare-and-swap instructions or compare-and-set instructions, the process comprising:
- a marking code receiving locations of one or more pointers which reside in a digital memory of the computing system, each pointer having an address portion which holds an address value and a non-address portion which is exclusive of the address portion;
- a mutator thread executing concurrently with the marking code and having access to at least the address portion of at least one of the pointers;
- the marking code using a non-CAS write instruction to mark an area of the memory by atomically setting a bit in the non-address portion of a pointer whose address identifies the area of memory, without said setting overwriting the address; and
- treating the identified memory differently when the bit is set than when the bit is not set;
- whereby the process performs the bit marking without reliance on CAS instructions.

18. The storage medium of claim 17, wherein using a non-CAS write instruction to atomically set the reference mark bit comprises:
- atomically reading a byte value from the non-address portion of the pointer into a variable;
- setting the bit in said variable; and then
- using the non-CAS write instruction to atomically write the value from said variable back into the non-address portion of the pointer.

19. The storage medium of claim 17, wherein atomically setting the bit takes a number of processor cycles that is denoted here as write-count, wherein the avoided CAS instructions include a fastest avoided CAS instruction which has a published processor cycle count that is denoted here as CAS-count, and wherein CAS-count is at least three times write-count.

20. The storage medium of claim 17, wherein setting the bit comprises at least one of the following:
- executing a processor instruction which performs a logical OR operation;
- executing a processor instruction which performs an operation that sets the most significant bit of an addressable unit of the memory.

* * * * *